United States Patent Office 2,900,411
Patented Aug. 18, 1959

2,900,411

WATER INSOLUBLE PLANT HORMONE CARBOXYLIC ACID SALTS OF HIGHER ALKYL AMINES

James Harwood, Western Springs, and Robert G. Brault and Richard A. Reck, Chicago, Ill., assignors to Armour and Company, Chicago, Ill., a corporation of Illinois No Drawing. Application November 4, 1950
Serial No. 194,184

11 Claims. (Cl. 260—501)

This invention relates to insoluble plant hormone herbicides. It relates particularly to herbicides comprising certain fatty amine salts of plant hormone carboxylic acids.

The development of compositions which may be applied to weed infested areas to eradicate the noxious vegetation, while at the same time leaving the desirable plants unharmed, has for a long time presented a problem of major significance. Within the last few years, it has been found that a group of chemicals known as the plant hormones are capable of exerting the desired selective herbicidal action referred to above, when applied in quantity to crop areas afflicted with excessive weed growth.

Plant hormones are the chemical hormone substances which have long been known to promote the growth of plants. Examples of such substances, which exist ordinarily in the form of plant hormone carboxylic acids, are auxin, which is widespread throughout the plant kingdom; 2,4-dichlorophenoxyacetic acid (commonly referred to as 2,4–D); β-indolylacetic acid; α-naphthaleneacetic acid; indolylbutyric acid; indolylpropionic acid; phenylacetic acid; and fluorine acetic acid. Although the herbicidal action of the plant hormones is not yet completely understood, it is believed that they kill certain weeds by stimulating them to excessive growth while at the same time exerting only a beneficial growth effect on desirable plants. In general, the plant hormones have a beneficial effect on narrow leaf plants such as grass and corn and a detrimental effect on broad leaf plants such as annual morning glory, thistle, dandelion, chick weed, lamb quarters, and ragweed.

In view of this unusual selective action, the plant hormones have been put to extensive commercial use during the past several years and have given results which have been generally satisfactory, with the exception that there has been difficulty in causing the hormone material to adhere to the plant foliage and to the soil for a sufficient length of time to exert its herbicidal action. These hormone substances, unfortunately, are relatively water soluble and leave something to be desired when used as herbicides in agriculture, since, with the first rain after application, the herbicide is washed off the weeds and leached out of the soil. Moreover, there appears to be reason to believe that a given quantity of herbicide is more effective if it is absorbed by the roots of weeds slowly and over an extended period of time, rather than being dissolved and absorbed readily within a short time.

An object of the present invention is to provide a plant hormone herbicide which is insoluble in water but which nevertheless may readily be dispersed or suspended in water or other media for easy application to crops or soil. A further object of the invention is to provide an insoluble plant hormone herbicide useful in sprays or in dust compositions for the selective prevention of weed growth and promotion of desirable plant growth. A still further object is to provide a plant hormone herbicide which is not readily washed off weeds or leached out of the soil by the action of rain or other weather conditions and which is absorbed by the roots of plants slowly and over an extended period of time. Other objects and advantages will appear as the specification proceeds.

We have found that, by reacting an aliphatic amine having at least 6 carbon atoms in an aliphatic radical thereof with a plant hormone carboxylic acid to form the salt of these two substances, we are able to obtain a highly insoluble herbicide possessing all of the above advantages. The extreme insolubility of these new salts is quite an unexpected characteristic since the ordinary salts of the higher aliphatic amines, as reported in the literature, are very soluble in water; and it would not have been expected that the present aliphatic amine salts might behave differently, since the plant hormone carboxylic acids are themselves relatively soluble in water.

The aliphatic amine involved in the present invention may be any aliphatic amine having 6 or more carbon atoms in an aliphatic radical thereof. It will be understood that such aliphatic amines include any straight or branched carbon chain, primary, secondary, or tertiary aliphatic amines, as well as the quaternary amines or quaternary ammonium compounds, having the requisite number of carbon atoms in the aliphatic radicals thereof. The amines used may be obtained from fatty acids of the natural fats or oils such as tallow, soya bean oil, cottonseed oil, coconut oil, etc., or from fractions of these natural acid mixtures. Examples of the amines which may be used are: primary amines, such as dodecylamine, tridecylamine, tetradecylamine, pentadecylamine, hexadecylamine, heptadecylamine, and octadecylamine; secondary amines, such as didodecylamine and dioctadecylamine; tertiary amines, such as tridodecylamine; and quaternary compounds, such as trimethyloctylammonium hydroxide and trimethyldodecylammonium hydroxide.

The plant hormones, examples of which have already been given, occur generally in the form of carboxylic acids, and these plant hormone carboxylic acids are the substances which may be reacted with the above-defined aliphatic amines to obtain the insoluble salts of the present invention.

The reaction between the amine and the carboxylic acid may be carried out in any suitable manner. For example, the two substances may be mixed in a solvent and warmed until a homogeneous solution is obtained and then cooled until precipitation of the desired salt is complete, after which it may be filtered and dried. If the particular amine used is a liquid, such as soyamine, a solvent may not be necessary in carrying out the reaction.

The aliphatic amine salts of the plant hormone carboxylic acids, prepared as above described, are found to be extremely insoluble, some of these compounds having a solubility in water as low as .003% at 25° C. It has been found that these new salts, possessed of the characteristic extreme water insolubility, are selective herbicidal compositions which are quite superior to the normal plant hormones, in that they are not washed away or leached out of the soil by rain and have the property of permeating into the roots of weeds slowly and over a long period of time. These new compositions have been shown to be especially adapted for use in large scale agriculture, particularly in corn farming, where they may be spread on the soil of a field seeded with corn and will prevent the growth of weeds for a sufficient length of time to enable the corn to grow tall and strong enough to develop to maturity unaffected by weeds. In addition to the prevention of weeds, the new salts, when applied in the form of spray or dust, are also useful in eradicating weeds which are already grown.

As specific examples of our invention, the following may be set out:

*Example 1*

18.5 grams of dodecylamine and 22 grams of 2,4-dichlorophenoxyacetic acid were mixed together in 250 ml.

of Skellysolve B and warmed until completely in solution. The solution was then cooled to room temperature and the amine salt of the plant hormone was filtered and dried. The dodecylamine salt of 2,4-dichlorophenoxyacetic acid had a solubility in water of 0.01% at 25° C. and possessed a melting point of 75–76° C.

*Example 2*

11 grams of octadecylamine and 9 grams of 2,4-dichlorophenoxyacetic acid were mixed together in ethyl acetate. The mixture was warmed until a solution was obtained. The cooled product was filtered and dried to yield 95% of the octadecylamine salt of 2,4-dichlorophenoxyacetic acid. The product had a solubility in water of 0.003% at 25° C. and a melting point of 77.5° C.

*Example 3*

11.8 grams of a hydrogenated tallow amine were mixed together with 10 grams of 2,4-dichlorophenoxyacetic acid in ethyl acetate. The product, the tallow amine salt of 2,4-dichlorophenoxyacetic acid, was filtered and dried.

*Example 4*

38.6 grams of didodecylamine and 22 grams of 2,4-dichlorophenoxyacetic acid were dissolved in hot ethyl acetate. When cooled to room temperature a yield of 75% of the crystals of the didodecylamine salt of 2,4-dichlorophenoxyacetic acid were filtered and dried.

*Example 5*

35.6 grams of hydrogenated dioctadecylamine and 14.4 grams of 2,4-dichlorophenoxyacetic acid were dissolved in 100 grams of warm benzene. When cooled, the crystals of the dioctadecylamine salt of 2,4-dichlorophenoxyacetic acid were filtered and dried.

*Example 6*

10 grams of bis(2-hydroxyethyl)soyamine were mixed with 5 grams of 2,4-dichlorophenoxyacetic acid to form a viscous solution of the bis(2-hydroxyethyl)soyamine salt of 2,4-dichlorophenoxyacetic acid.

*Example 7*

18.6 grams of a mixture of $C_8$, $C_{10}$, $C_{12}$ and $C_{14}$ amines were mixed with 15.2 grams of phenoxyacetic acid. The heat of reaction gave a clear liquid which became solid on cooling to room temperature. The product was the dodecylamine salt of phenoxyacetic acid.

*Example 8*

13.5 grams of octadecylamine and 7.6 grams of phenoxyacetic acid were mixed together in 100 ml. of toluene. The product was the octadecylamine salt of phenoxyacetic acid.

*Example 9*

18.1 grams of dioctadecylamine and 5.1 grams of phenoxyacetic acid were mixed together in 100 ml. of toluene. The product was the dioctadecylamine salt of phenoxyacetic acid.

While in the foregoing specification we have set forth illustrative embodiments in considerable detail for the purpose of explaining the invention, it will be understood that such details may be varied widely by those skilled in the art without departing from the spirit of our invention.

We claim:

1. A water-insoluble herbicide comprising a salt of a plant hormone carboxylic acid with an aliphatic amine having at least 6 carbon atoms in an aliphatic hydrocarbon radical thereof.

2. A water-insoluble herbicide comprising the octadecylamine salt of a plant hormone carboxylic acid.

3. A water-insoluble herbicide comprising the tallow amine salt of a plant hormone carboxylic acid.

4. A water-insoluble herbicide comprising the didodecylamine salt of a plant hormone carboxylic acid.

5. A water-insoluble herbicide comprising the salt of 2,4-dichlorophenoxyacetic acid with an aliphatic amine having at least 6 carbon atoms in an aliphatic hydrocarbon radical thereof.

6. A water insoluble herbicide comprising the octadecylamine salt of 2,4-dichlorophenoxyacetic acid.

7. A water-insoluble herbicide comprising the tallow amine salt of 2,4-dichlorophenoxyacetic acid.

8. A water-insoluble herbicide comprising a salt of a plant hormone carboxylic acid selected from the group consisting of auxin, 2,4-dichlorophenoxyacetic acid, phenoxyacetic acid, β-indolylacetic acid, α-naphthaleneacetic acid, indolylbutyric acid, indolylpropionic acid, phenylacetic acid and fluorine acetic acid with an aliphatic amine having at least 6 carbon atoms in an aliphatic hydrocarbon radical thereof.

9. A water-insoluble herbicide according to claim 8 comprising the octadecylamine salt of the selected plant hormone carboxylic acid.

10. A water-insoluble herbicide according to claim 8 comprising the tallow amine salt of the selected plant hormone carboxylic acid.

11. A water-insoluble herbicide according to claim 8 comprising the didodecylamine salt of the selected plant hormone carboxylic acid.

References Cited in the file of this patent

UNITED STATES PATENTS

| | | |
|---|---|---|
| 2,274,807 | Rawlins et al. | Mar. 3, 1942 |
| 2,278,499 | Smith et al. | Apr. 7, 1942 |
| 2,322,761 | Lontz | June 29, 1943 |
| 2,390,941 | Jones | Dec. 11, 1945 |
| 2,396,513 | Jones | Mar. 12, 1946 |
| 2,472,347 | Sexton et al. | June 7, 1949 |

OTHER REFERENCES

Sibbit et al.: Chem. Abstracts, vol. 42, p. 7911 (1948).

Zussman: "Agricultural Chemicals," April 1949, pp. 27–29.

Iowa State College, J. of Science, vol. 24, No. 2, January 1950 (complete article pp. 189 to 208), pp 190 and 197 particularly relied on.